(12) United States Patent
Kim et al.

(10) Patent No.: US 8,432,501 B2
(45) Date of Patent: Apr. 30, 2013

(54) LIQUID CRYSTAL DISPLAY WITH IMPROVED SIDE VISIBILITY

(75) Inventors: Jae-Hyun Kim, Yongin (KR); Gee-Bum Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 620 days.

(21) Appl. No.: 12/695,059

(22) Filed: Jan. 27, 2010

(65) Prior Publication Data

US 2011/0085099 A1 Apr. 14, 2011

(30) Foreign Application Priority Data

Oct. 9, 2009 (KR) ........................ 10-2009-0096109

(51) Int. Cl.
*G02F 1/1343* (2006.01)

(52) U.S. Cl.
USPC ............................................ 349/39; 349/139

(58) Field of Classification Search .......... None
See application file for complete search history.

(56) References Cited

U.S. PATENT DOCUMENTS

| | | | |
|---|---|---|---|
| 5,434,685 A | 7/1995 | Pirs et al. | |
| 6,195,140 B1 * | 2/2001 | Kubo et al. | 349/44 |
| 7,821,603 B2 | 10/2010 | Takeda et al. | |
| 2005/0105023 A1 | 5/2005 | Kim et al. | |
| 2007/0109467 A1 | 5/2007 | Chang et al. | |
| 2008/0030636 A1 * | 2/2008 | Huang et al. | 349/38 |

FOREIGN PATENT DOCUMENTS

| | | |
|---|---|---|
| JP | 2000-002889 | 1/2000 |
| JP | 2007-264443 | 10/2007 |
| KR | 1999-006951 | 1/1999 |
| KR | 10-1999-0014250 | 2/1999 |
| KR | 10-0457365 B1 | 11/2004 |
| KR | 10-2006-0001028 | 1/2006 |
| KR | 10-2007-0015982 | 2/2007 |
| KR | 102007010482 A | 10/2007 |
| KR | 10-2008-0025544 | 3/2008 |
| KR | 10-2008-0086730 | 9/2008 |
| KR | 1020090060756 A | 6/2009 |

OTHER PUBLICATIONS

KIPO Office action dated Nov. 30, 2011, for Korean Patent application 10-2009-0096110, priority to cross-reference U.S. Appl. No. 12/717,861, 1 page.
U.S. Office action dated Nov. 23, 2011, for cross reference U.S. Appl. No. 12/717,861, 10 pages.
KIPO Office action dated Nov. 30, 2011, for Korean priority Patent application 10-2009-0096109, 1 page.
Korean Patent Abstracts, Publication No. 1020010085598, dated Sep. 7, 2001, corresponding to Korean Patent 10-0457365.
KIPO Office action dated Mar. 17, 2011, for Korean priority Patent application 10-2009-0096109.
KIPO Office action dated Mar. 18, 2011, for Korean Patent application 10-2009-0098183.
U.S. Office action dated May 11, 2012 for cross reference U.S. Appl. No. 12/717,861, (10 pages).

* cited by examiner

*Primary Examiner* — Lucy Chien
(74) *Attorney, Agent, or Firm* — Christie, Parker & Hale, LLP

(57) ABSTRACT

In a high-resolution liquid crystal display with improved side visibility, a unit pixel includes first and second sub-pixels in which liquid crystals are continuously aligned and electrically connected. An electric-field reducing layer is located on a pixel electrode for implementing the second sub-pixel, so that a liquid crystal application voltage applied to the second sub-pixel is lower than that applied to the first sub-pixel.

19 Claims, 4 Drawing Sheets

LIQUID CRYSTAL DISPLAY WITH IMPROVED SIDE VISIBILITY

CROSS-REFERENCE TO RELATED APPLICATIONS

This application claims priority to and the benefit of Korean Patent Application No. 10-2009-0096109, filed on Oct. 9, 2009, in the Korean Intellectual Property Office, the entire content of which is incorporated herein by reference.

BACKGROUND

1. Field

Non-limiting example embodiments of the present invention relate to a liquid crystal display (LCD), and more particularly, to an LCD which is an electric device of changing various types of electrical information generated from various devices into visual information through a change in transmittance of liquid crystals by applying a voltage thereto, and displaying the visual information.

2. Description of the Related Art

In general, a liquid crystal display (LCD) is a display that displays images by controlling transmittance of light incident from a light source, using the optical anisotropy of liquid crystal molecules and the polarization property of a polarizing plate. Because of light, thin, high-resolution and large-size characteristics of LCDs, their application fields have been rapidly extended.

However, since images are displayed by transmitting light only to the light transmission axis of liquid crystal molecules, such LCDs have a narrower viewing angle that those of other displays.

Therefore, various technologies for improving the viewing angle have been developed such as, a patterned vertical alignment (PVA) mode. In the PVA mode, liquid crystal molecules are aligned vertically to upper and lower substrates, and cut-away patterns are formed at a pixel electrode and a common electrode opposite to the pixel electrode, respectively. Therefore, a plurality of multi domains are formed by distorting the electric field formed between the two electrodes.

However, like the PVA mode LCD, a vertical alignment type LCD has lower side visibility than front visibility. For example, in a PVA mode LCD having cut-away portions, a gamma characteristic is seriously distorted as viewed further away from the center to the front side, and in the worst case, the difference in luminance between high grayscales disappears. Therefore, the image may get distorted.

To solve such a problem, a method has been proposed in which, one pixel is divided into two sub-pixels, and a total storage capacitance is graded so that a high voltage is applied to a sub-pixel having a large storage capacitance and a low voltage is applied to a sub-pixel having a small storage capacitance, resulting in different transmittances.

However, when this method of dividing one unit pixel into two sub-pixels is applied to a high-resolution (e.g., 250 PPI or higher) LCD, the aperture ratio of the LCD is considerably lowered. Therefore, it is difficult to practically apply the method to the high resolution LCD.

SUMMARY

Non-limiting example embodiments of the present invention provide a high-resolution liquid crystal display (LCD) having an improved side visibility without lowering an aperture ratio.

According to some non-limiting example embodiments of the present invention, a LCD includes a unit pixel, a storage line, a thin film transistor, a storage electrode, a pixel electrode and an electric-field reducing layer. The unit pixel may include gate lines and data lines overlapping the gate lines. The storage line may pass through the unit pixel. The thin film transistor may be located in the unit pixel. The storage electrode may be connected to a drain electrode of the thin film transistor. The storage electrode may be located in a region of the unit pixel overlapping with the storage line. The pixel electrode may be located in a region in the unit pixel. The pixel electrode is electrically connected to the storage electrode through a contact hole in one region of the unit pixel overlapping with the storage line. The electric-field reducing layer is located on the pixel electrode. The unit pixel includes a first sub-pixel is a first region of the pixel electrode, which does not overlap with the electric-field reducing layer, and a second sub-pixel in a second region of the pixel electrode, which overlaps with the electric-field reducing layer.

In one non-limiting example embodiment, the storage line may be formed in the same layer together with the gate lines, and the storage electrode may be formed in the same layer together with the data lines.

The storage line and the storage electrode may be formed using a transparent conductive material.

In one non-limiting example embodiment, a protective layer and a planarization layer are interposed between the storage electrode and the pixel electrode, and the contact hole is in a region of the protective layer and the planarization layer, which overlaps with the storage electrode so that the storage electrode and the pixel electrode are electrically connected to each other.

The protective layer may be formed using a silicon nitride (SiNx), and the planarization layer may be an organic insulating material. The electric-field reducing layer may be formed using a silicon nitride (SiNx), silicon oxide (SiO$_2$) or organic insulating material.

In one non-limiting example embodiment, the contact hole is at a central portion or a portion except the central portion based on the area ratio of the first and second pixel electrodes, and operations of liquid crystal molecules are controlled using an anchoring force of liquid crystals positioned in the contact hole.

In one non-limiting example embodiment, the electric-field reducing layer is formed on a region of the pixel electrode having the contact hole, and an end of the electric-field reducing layer on the pixel electrode in the unit pixel is formed to overlap with the storage line.

According to some non-limiting example embodiments of the present invention, a LCD includes a unit pixel, a thin film transistor, and an electric-field reducing layer. The unit pixel including gate lines and data lines overlapping the gate lines. The unit pixel includes a first sub-pixel and a second sub-pixel electrically coupled to each other. The storage capacitor is shared by the first sub-pixel and a second sub-pixel. The thin film transistor is located in the unit pixel and shared by the first sub-pixel and a second sub-pixel. The electric-field reducing layer overlaps the second sub-pixel and the electric-field reducing layer is configured to lower an application voltage applied to the unit pixel so that a lower voltage may be applied to the second sub-pixel than the first sub-pixel.

According to some non-limiting example embodiments of the present invention, when a unit pixel is divided into first and second sub-pixels, the first and second sub-pixels are not electrically isolated from each other, but an electric-field reducing layer is formed on a pixel electrode for implementing the second sub-pixel, so that liquid crystals are continuously aligned in the first and second sub-pixels. Accordingly, a high-resolution LCD having a vertical alignment type can have an improved side visibility without lowering an aperture ratio.

DETAILED DESCRIPTION

Figure 1:
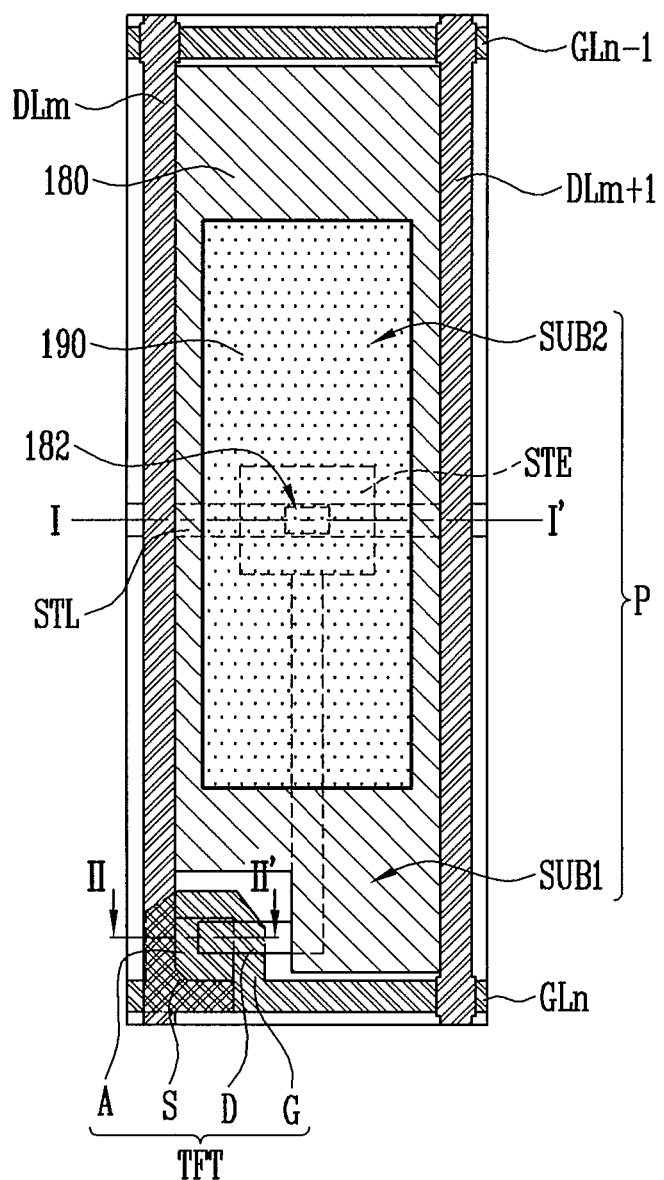
FIG. 1 is a plan view illustrating a unit pixel of a liquid crystal display (LCD) according to some non-limiting example embodiments of the present invention.

In the following detailed description, only certain non-limiting example embodiments of the present invention have been shown and described, simply by way of illustration. As those skilled in the art would realize, the described non-limiting example embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Figure 2A:
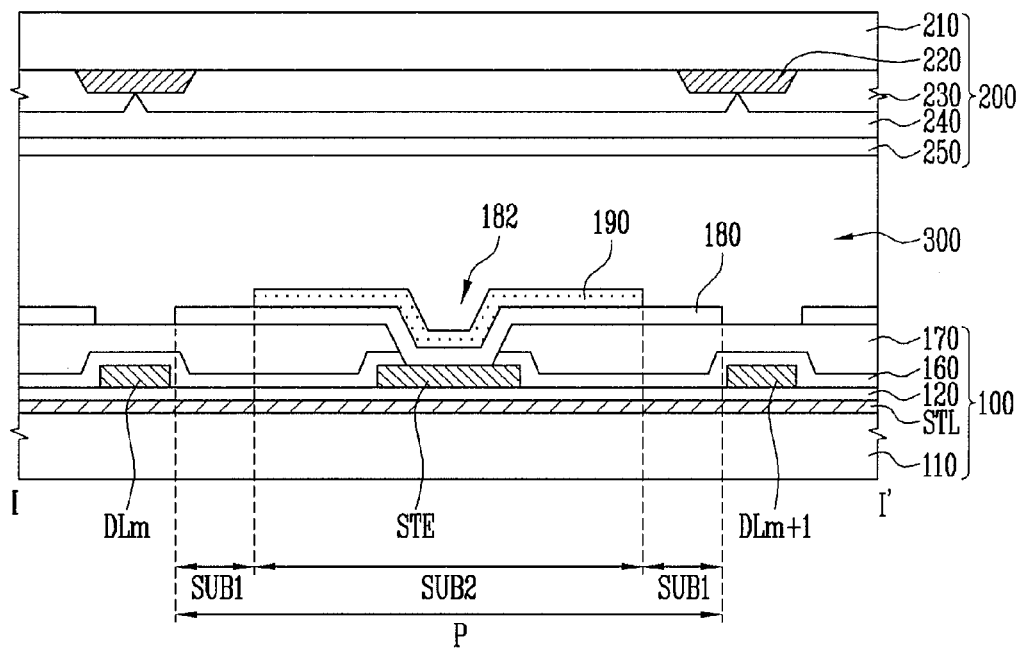
FIGS. 2A and 2B are sectional views taken along lines I-I' and II-II' of FIG. 1, respectively.
Figure 2B:
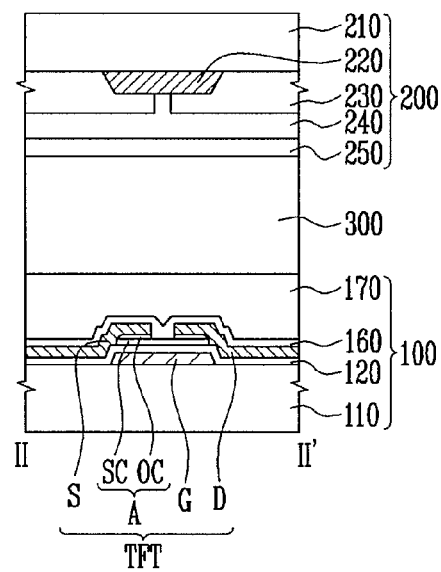

FIG. 1 is a plan view illustrating a unit pixel of a liquid crystal display (LCD) according to some non-limiting example embodiments of the present invention. FIGS. 2A and 2B are sectional views taken along lines I-I' and II-II' of FIG. 1, respectively.

Specifically, FIG. 2A is a sectional view illustrating a region including a storage line passing through the unit pixel, and FIG. 2B is a sectional view illustrating a region at which a thin film transistor is formed in the unit pixel.

Referring to FIGS. 1, 2A and 2B, the LCD 400 may include a first substrate 100, a second substrate 200 and a liquid crystal layer 300 interposed between the first and second substrates 100 and 200.

The first substrate 100 may include a transparent substrate 110, gate lines GLn−1, GLn, . . . , data lines DLm, DLm+1, . . . , a thin film transistor TFT, a protective layer 160, a pixel electrode 180, a storage line STL, and a storage capacitor Cst (not explicitly shown) formed by a storage electrode STE.

The gate lines GLn−1, GLn, . . . may extend in a first direction (X) on the transparent substrate 110. The gate lines GLn−1, GLn, . . . may be first metal patterns formed by patterning a first metal layer.

A gate insulating layer 120 may be formed on the transparent substrate 110 having the gate lines GLn−1, GLn, . . . formed thereon. The gate insulating layer 120 may include a silicon nitride (SiNx), for example.

The data lines DLm, DLm+1, . . . extending in a second direction (Y) perpendicular to the first direction (X) may be formed on the gate insulating layer 120.

In some non-limiting example embodiments, the data lines DLm, DLm+1, . . . may be second metal patterns formed by patterning a second metal layer. Unit pixels P arranged in a matrix form may be defined by intersecting the data lines DLm, DLm+1, . . . and the gate lines GLn−1, GLn, . . . on the transparent substrate 110. Here, the data lines and/or the gate lines may extend along the boundary of the unit pixel. However, the date lines and/or the gate lines may extend such that the data lines and/or the gate lines may pass through the unit pixel.

Hereinafter, a unit pixel P defined by overlap of an n-th gate line GLn and an m-th data line DLm will be described in detail.

The unit pixel P may include a thin film transistor TFT, a pixel electrode 180, a storage line STL, a storage electrode STE, and an electric-field reducing layer 190 (hereinafter, referred to as ERL layer), formed on one region of the pixel electrode 180.

The thin film transistor TFT may be formed at an intersection portion of the n-th gate line GLn and the m-th data line DLm, and may include a gate electrode G, an active layer A, a source electrode S and a drain electrode D.

The gate electrode G may be a first metal pattern protruding from the n-th gate line GLn. The gate insulating layer 120 may be formed on the gate electrode G, and the active layer A overlapping with the gate electrode G may be formed on the gate insulating layer 120.

The active layer A may be formed into a structure in which a semiconductor layer SC and an ohmic contact layer OC may be stacked. For example, in some non-limiting example embodiments, the semiconductor layer SC may be formed using an amorphous silicon (a-Si:H), and the ohmic contact layer may be formed using an amorphous silicon (n+a-Si:H) highly doped with an n-type impurity.

The source and drain electrodes S and D formed using a second metal pattern substantially the same as that of the data lines DLm, DLm+1, . . . may be formed on the active layer A.

The source electrode S may protrude from the m-th data line DLm and may partially overlap with the active layer A. The drain electrode D may be formed to be spaced apart from the source electrode S at a predetermined interval, and may partially overlap with the active layer A.

The ohmic contact layer OC may be then removed in the spacing portion of the source and drain electrodes S and D, and the semiconductor layer SC may be exposed.

The thin film transistor TFT may be a switching element that applies a data voltage to the pixel electrode 180 in response to a timing signal applied from the gate electrode G.

In the non-limiting example embodiment illustrated in FIGS. 1 and 2, a thin film transistor TFT provided to each of the unit pixels P is included in a bottom gate structure employing an active layer including amorphous silicon. However, the non-limiting example embodiments of the present invention may not be limited thereto.

As illustrated in FIG. 2A, the pixel electrode 180 may be formed in a region of the unit pixel P defined by the gate and data lines. The pixel electrode 180 may be electrically connected to the storage electrode STE through a contact hole 182 formed in one region of the unit pixel P overlapping with the storage line STL.

As illustrated in FIG. 1, the storage electrode STE may be formed in a region overlapping with the storage line STL in the unit pixel. The storage electrode STE may be formed in the same layer together with the drain electrode D of the thin film transistor TFT and electrically connected to the drain electrode D. For example, the storage electrode STE and the drain electrode D may be formed using the same metallic material. However, the non-limiting example embodiments of the present invention may not be necessarily limited thereto.

The ERL layer 190 may be formed on a region of the pixel electrode 180 having the contact hole 182. Consequently, the region of the pixel electrode 180 overlapping with the ERL layer 190 may become a second sub-pixel SUB2, and the region of the unit pixel P except the second sub-pixel SUB2, i.e., the region of the pixel electrode 180, in which the ERL layer 190 may not be formed, may become a first sub-pixel SUB1. The specific shape, material and forming layer of the pixel electrode 180 will be described later.

The contact hole 182 may be formed at a central portion or a portion except the central portion based on the area ratio of the first sub-pixel SUB1 to the second sub-pixel SUB2. The area ratio of the first sub-pixel SUB1 to the second sub-pixel SUB2 may be about 1:3 to about 1:2 according to some non-limiting example embodiments of the present invention.

The storage line STL may be formed in the same layer together with the gate lines GLn−1, GLn, . . . , and may extend in the first direction (X) to pass through the unit pixel P, as illustrated in FIG. 1. Here, the storage line STL and the gate lines may be formed using the same metallic material. However, the non-limiting example embodiments of the present invention are not necessarily limited thereto.

The storage electrode STE may be a metal pattern electrically connected to the drain electrode D. The storage electrode STE may overlap with the storage line STL in each of the unit pixels P to form storage capacitance of each of the unit pixels P.

That is, the storage electrode STE and the storage line STL may overlap with each other with the gate insulating layer 120 interposed therebetween to form a storage capacitor Cst charged with a data voltage during one frame.

Moreover, a protective layer 160 and a planarization layer 170 may be sequentially formed on the transparent substrate 110 on which the thin film transistor TFT and the storage capacitor Cst are formed. As described above, the contact hole 182 may be formed in the region of the protective layer 160 and the planarization layer 170, corresponding to the central portion of the unit pixel P, so that the storage electrode STE may be exposed.

For example, the protective layer 160 may be formed using a silicon nitride (SiNx), and the planarization layer 170 may be formed using an organic insulating material.

Thus, the pixel electrode 180 may be formed on the planarization layer 170 having the contact hole 182 formed therein. The pixel electrode 180 may be formed using a transparent conductive material. For example, the pixel electrode 180 may be formed using indium tin oxide (ITO), indium zinc oxide (IZO) or the like.

The pixel electrode 180 may be electrically connected to the storage electrode STE through the contact hole 182, and a data voltage may be applied to the pixel electrode 180.

As described above, in the non-limiting example embodiments of the present invention, the ERL layer 190 may be formed on the region of the pixel electrode 180 having the contact hole 182. Accordingly, the region of the pixel electrode 180 overlapping with the ERL layer 190 may become the second sub-pixel SUB2, and the region of the unit pixel P except the second sub-pixel SUB2, i.e., the region of the pixel electrode 180, in which the ERL layer 190 may not be formed, may become the first sub-pixel SUB1.

The ERL layer 190 may be formed using a silicon nitride (SiNx) or silicon oxide ($SiO_2$). The function of the ERL layer 190 will be described in detail with reference to FIG. 3.

The second substrate 200, which is in surface contact with the first substrate 100 and opposing the pixel electrode 180, may include a transparent substrate 210, a black matrix 220, a color filter 230 and a common electrode 250.

The black matrix 220 may be formed on a surface of the transparent substrate 210 substantially opposite to the first substrate 100. For example, the black matrix 220 may be formed to correspond to the gate and data lines formed on the first substrate 100. Thus, the black matrix 220 may prevent light from leaking between the unit pixels.

The color filter 230 may include, for example, red, green and blue filters, and the red, green and blue filters may be formed on the transparent substrate 210 such that the red, green and blue filters may correspond to the respective unit pixels P. The color filter 230 and the black matrix 220 may partially overlap with each other.

The second substrate 200 may further include an overcoat layer 240 formed on the color filter 230. The overcoat layer 240 may planarize the surface of the transparent substrate 210 where the black matrix 220 and the color filter 230 are formed.

The common electrode 250 may be formed on the overcoat layer 240 such that the common electrode 250 may correspond to the entire surface of the second substrate 200.

The common electrode 250 may be formed using a transparent conductive material. For example, the common electrode 250 may be formed using ITO, IZO or the like.

A contact hole (not shown) may be formed in the region corresponding to the contact hole 182 formed in the unit pixel P on the first substrate 100.

The storage line STL and the storage electrode STE may be components that are formed at a constant area ratio in the unit pixel P to form a storage capacitor Cst charged with the data voltage. However, when the storage line STL and the storage electrode STE may be formed using an opaque metallic material, the storage line STL and the storage electrode STE may shield light to result in a low aperture ratio of the unit pixel P.

When the LCD may be driven, liquid crystal molecules may be aligned at an angle at which light may not be emitted by allowing the liquid crystal molecules to collide each other in a region corresponding to the contact hole 182, and hence a singular point may be formed, at which light may be not emitted. Therefore, the contact hole 182 may be a factor that causes the aperture ratio of the unit pixel P to be lowered.

Accordingly, the storage line STL, the storage electrode STE and the contact hole 182, which may be factors that may cause the aperture of the unit pixel P to be lowered, are formed to overlap with one another, so that it is possible to prevent the aperture ratio of the unit pixel P from being lowered by the factors.

In the non-limiting example embodiment of the present invention, the storage line STL and the storage electrode STE, forming the storage capacitor Cst, may be formed using a transparent conductive material, thereby preventing the lowering of the aperture ratio.

Figure 3:
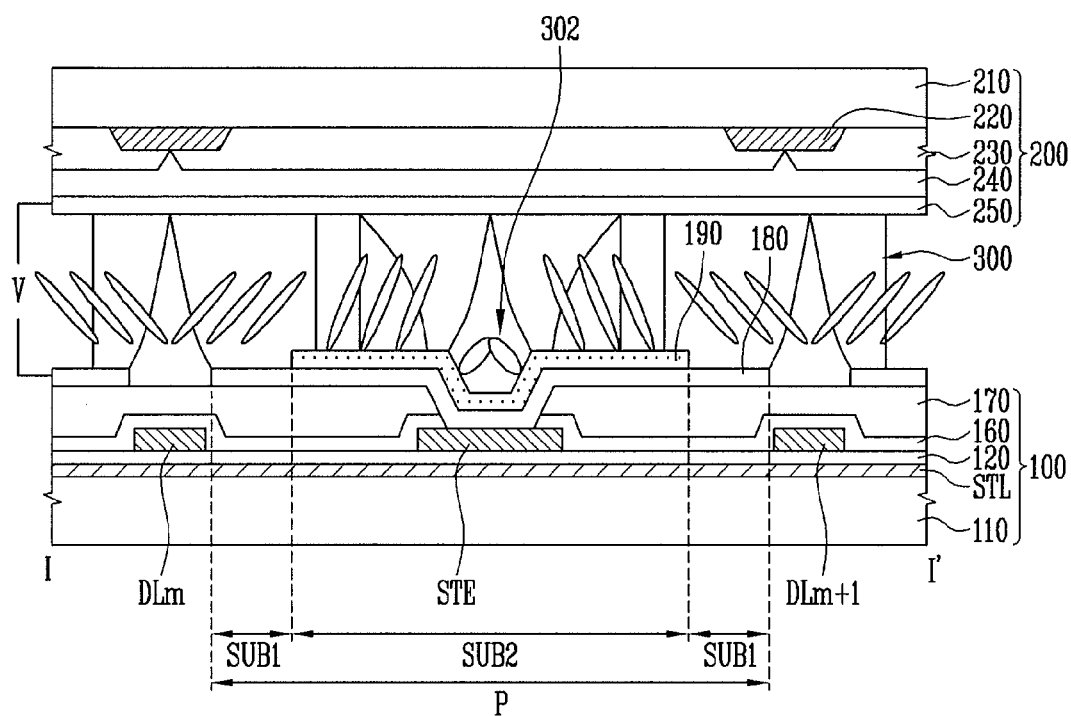
FIG. 3 is a sectional view conceptually illustrating the driving of the LCD illustrated in FIG. 1.

FIG. 3 is a sectional view conceptually illustrating a driving of the LCD illustrated in FIG. 1. Here, the driving of the LCD will be described using the sectional region of FIG. 2A.

Referring to FIG. 3, when no voltage is applied to the pixel electrode 180 and the common electrode 250, an electric field may not be formed between the first and second substrates 100 and 200. In this case, liquid crystal molecules in the liquid crystal layer 300 may be in a vertical alignment state. Therefore, although light may be provided from the rear of the LCD panel, the light may not pass through the liquid crystal layer 300.

On the other hand, when a voltage V is applied to the pixel electrode 180 and the common electrode 250, electric field lines may be formed in a diagonal direction in the vicinity of the contact hole 182, and liquid crystal molecules adjacent to the electric field lines may rapidly respond first. Accordingly, the liquid crystal molecules may be realigned in a direction substantially vertical or parallel to the electric field lines in the vicinity of the contact hole 182, so that light may pass through the liquid crystal layer 300.

That is, the LCD according to the non-limiting example embodiment of the present invention may control operations of liquid crystal molecules using an anchoring force of liquid crystals 302 positioned in the contact hole 182 formed at the central portion of the unit pixel P.

In some non-limiting example embodiments, polymer stabilized liquid crystals (PSLCs) may be applied to improve a liquid crystal control force and response speed and bruising properties in the contact hole 182.

Similarly, as illustrated in FIG. 3, electric field lines may be also formed in a diagonal direction in an edge region of the unit pixel P, and liquid crystal molecules adjacent to the electric field lines may rapidly respond first. Accordingly, the liquid crystal molecules may be realigned in a direction substantially vertical or parallel to the electric field lines in the edge region of the unit pixel P, so that light may pass through the liquid crystal layer 300.

However, liquid crystal molecules positioned in a middle area between the contact hole 182 and the edge region may not be relatively influenced by the electric field lines, and therefore, a response speed may be lowered, thereby resulting in lowering of side visibility.

In the non-limiting example embodiment of the present invention, to solve such a problem, the ERL layer 190 may be formed on one region of the pixel electrode 180, and the unit pixel P may be divided into two sub-pixels SUB1 and SUB2, as illustrated in FIG. 3. Accordingly, the unit pixel P, divided into the two sub-pixels SUB1 and SUB2, may be driven by respectively applying transmittances to the two sub-pixels SUB1 and SUB2, so that it is possible to prevent side visibility from being lowered. As described above, the ERL layer 190 may be formed using a silicon nitride (SiNx), silicon oxide ($SiO_2$) or organic insulating material.

In the related art, when the unit pixel P may be divided into a plurality of sub-pixels, individual thin film transistors and storage capacitors may be respectively used in the sub-pixels by electrically isolating the sub-pixels from one another. However, in the non-limiting example embodiment of the present invention, the first and second sub-pixels SUB1 and SUB2 may be electrically connected to each other, and the same thin film transistor TFT and storage capacitor Cst are used in or shared by the first and second sub-pixels SUB1 and SUB2.

Accordingly, in the non-limiting example embodiment of the present invention, a high-resolution (e.g., 250 PPI or higher) LCD can have an improved side visibility without lowering an aperture ratio.

More specifically, although a data voltage substantially the same as that applied to the first sub-pixel SUB1, which is a region in which the ERL layer 190 is not formed, may be applied to the region in which the ERL layer 190 is formed on the pixel electrode 180, i.e., the second sub-pixel SUB2, the ERL layer 190 serves as a dielectric substance added to a liquid crystal capacitor. Therefore, the liquid crystal application voltage applied to the second sub-pixel SUB2 may be lower than that of the first sub-pixel SUB1.

As described above, as the liquid crystal application voltages of the first and second sub-pixels SUB1 and SUB2 may be different in the same data signal, the liquid crystals may be aligned so that the light, may be transmitted in various directions, thereby improving side visibility.

That is, in the non-limiting example embodiment of the present invention, the unit pixel P may include first and second sub-pixels SUB1 and SUB2 in which liquid crystals may be continuously aligned without being electrically isolated, and the ERL layer 190 may be formed on the pixel electrode 180 for implementing the second sub-pixel SUB2, so that the liquid crystal application voltage applied to the region of the second sub-pixel SUB2 may be lower than that applied to the region of the first sub-pixel SUB1. Accordingly, the transmittances of the first and second sub-pixels SUB1 and SUB2 in the unit pixel P may be different from each other, thereby improving side visibility.

Figure 4:
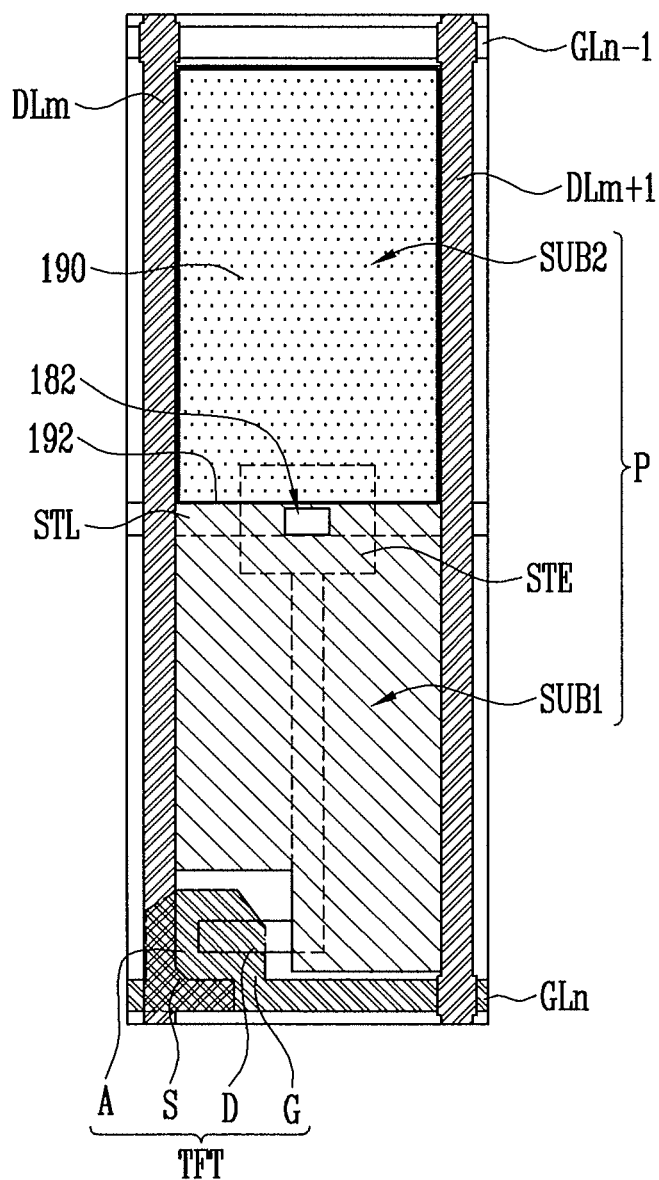
FIG. 4 is a plan view illustrating a unit pixel of an LCD according to a non-limiting example embodiment of the present invention.

FIG. 4 is a plan view illustrating a unit pixel of an LCD according to some non-limiting example embodiments of the present invention.

The unit pixel of the LCD illustrated in FIG. 4 is different from that illustrated in FIG. 1 in that the ERL layer 190 may be formed on a region in which it does not overlap with the contact hole 182. However, the configuration and operation of the unit pixel of the LCD illustrated in FIG. 4 are substantially the same as those of the unit pixel of the LCD illustrated in FIG. 1. Therefore, like reference numerals refer to like elements, and their detailed descriptions will be omitted.

In the non-limiting example embodiments illustrated in FIG. 4, an end 192 of the ERL 190 formed on the pixel electrode 180 in the unit pixel P may be formed to overlap with the storage line STL, thereby preventing a light leakage phenomenon generated by the step of the end 192 of the ERL 190.

While the present invention has been described in connection with certain non-limiting example embodiments, it is to be understood that the invention is not limited to the disclosed non-limiting example embodiments, but, on the contrary, is intended to cover various modifications and equivalent arrangements included within the spirit and scope of the appended claims, and equivalents thereof.

What is claimed is:

1. A liquid crystal display (LCD) comprising:
   a unit pixel including gate lines and data lines overlapping the gate lines;
   a storage line passing through the unit pixel;
   a thin film transistor in the unit pixel;
   a storage electrode electrically coupled to a drain electrode of the thin film transistor, the storage electrode being located in a region of the unit pixel overlapping with the storage line;
   a pixel electrode in a region in the unit pixel, the pixel electrode being electrically coupled to the storage electrode through a contact hole located in a region of the unit pixel overlapping with the storage line; and
   an electric-field reducing layer on the pixel electrode, wherein the unit pixel includes a first sub-pixel in a first region of the pixel electrode, which does not overlap with the electric-field reducing layer, and a second sub-pixel in a second region of the pixel electrode, which overlaps with the electric-field reducing layer.

2. The LCD according to claim 1, wherein the storage line is located in a same layer as the gate lines.

3. The LCD according to claim 1, wherein the storage electrode is located in a same layer as the data lines.

4. The LCD according to claim 1, wherein the storage line and the storage electrode includes a transparent conductive material.

5. The LCD according to claim 1, wherein a protective layer and a planarization layer are interposed between the storage electrode and the pixel electrode, and the contact hole is located in a region of the protective layer and the planarization layer, which overlaps with the storage electrode so that the storage electrode and the pixel electrode are electrically coupled to each other.

6. The LCD according to claim 5, wherein the protective layer is a silicon nitride (SiNx), and the planarization layer is an organic insulating material.

7. The LCD according to claim 1, wherein the electric-field reducing layer is a silicon nitride, silicon oxide or organic insulating material.

8. The LCD according to claim 1, wherein the contact hole is at a central portion or at a portion except the central portion based on the area ratio of the first and second pixel electrodes, and operations of liquid crystal molecules are controlled using an anchoring force of liquid crystals positioned in the contact hole.

9. The LCD according to claim 8, wherein the liquid crystals are polymer stabilized liquid crystals.

10. The LCD according to claim 1, wherein the electric-field reducing layer is on a region of the pixel electrode having the contact hole.

11. The LCD according to claim 1, wherein an end of the electric-field reducing layer on the pixel electrode in the unit pixel overlaps with the storage line.

12. A liquid crystal display (LCD) comprising:
a unit pixel including gate lines and data lines overlapping the gate lines, the unit pixel including a first sub-pixel and a second sub-pixel electrically coupled to each other;
a storage capacitor shared by the first sub-pixel and a second sub-pixel;
a thin film transistor in the unit pixel and shared by the first sub-pixel and a second sub-pixel; and
an electric-field reducing layer overlapping the second sub-pixel and configured to lower an application voltage applied to the unit pixel so that a lower voltage is applied to the second sub-pixel than the first sub-pixel, wherein the electric-field reducing layer is a silicon nitride, silicon oxide or organic insulating material.

13. The LCD according to claim 12, further comprising a pixel electrode in a region in the unit pixel, the pixel electrode being electrically coupled to the storage capacitor.

14. The LCD according to claim 13, wherein the first sub-pixel is in a first region of the pixel electrode, which does not overlap with the electric-field reducing layer, and the second sub-pixel is in a second region of the pixel electrode, which overlaps with the electric-field reducing layer.

15. The LCD according to claim 14, wherein the storage capacitor is located by a storage line in a same layer as the gate lines and a storage electrode in a same layer as the data lines.

16. The LCD according to claim 15, wherein the storage line and the storage electrode includes a transparent conductive material.

17. The LCD according to claim 15, wherein the pixel electrode being electrically coupled to the storage electrode through a contact hole located in a region of the unit pixel overlapping with the storage line.

18. The LCD according to claim 15, wherein an end of the electric-field reducing layer on the pixel electrode in the unit pixel overlaps with the storage line.

19. The LCD according to claim 12, wherein the liquid crystals are polymer stabilized liquid crystals.

* * * * *